Figure 1:
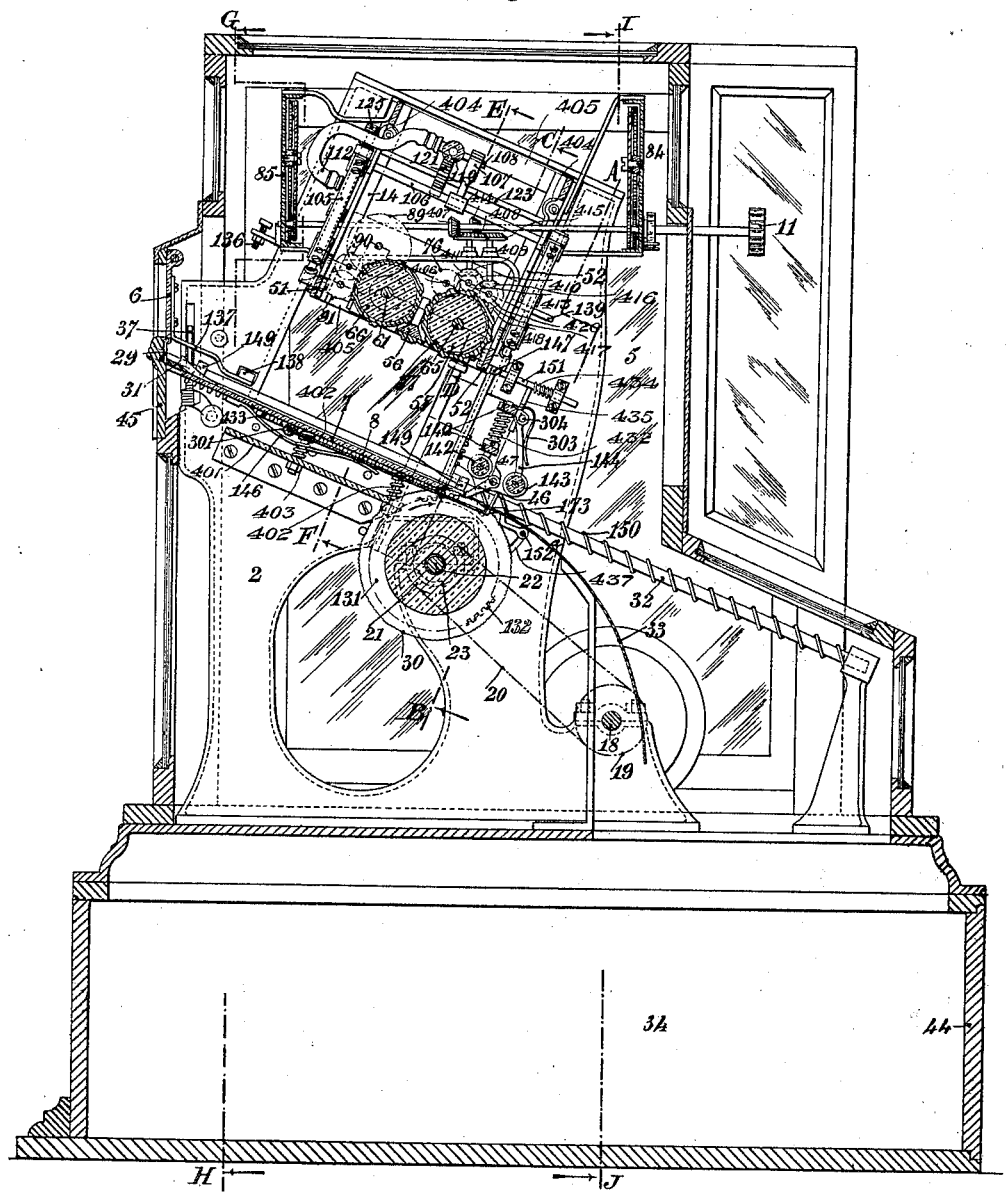

No. 692,512. Patented Feb. 4, 1902.
A. FRANC & F. VOLAND.
APPARATUS FOR AUTOMATICALLY INSURING, REGISTERING, AND FRANKING LETTERS.
(Application filed Sept. 25, 1900.)

(No Model.) 12 Sheets—Sheet 1.

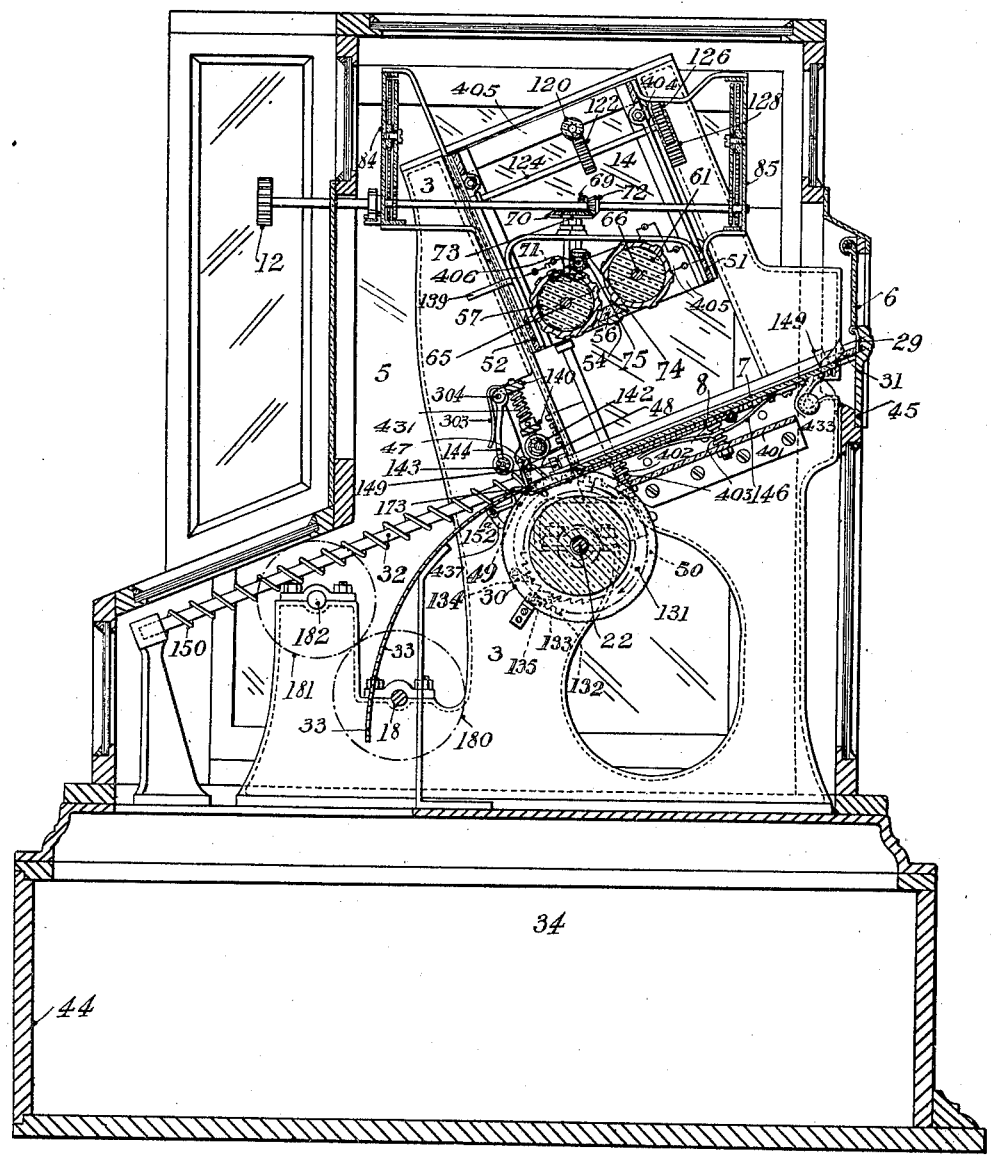

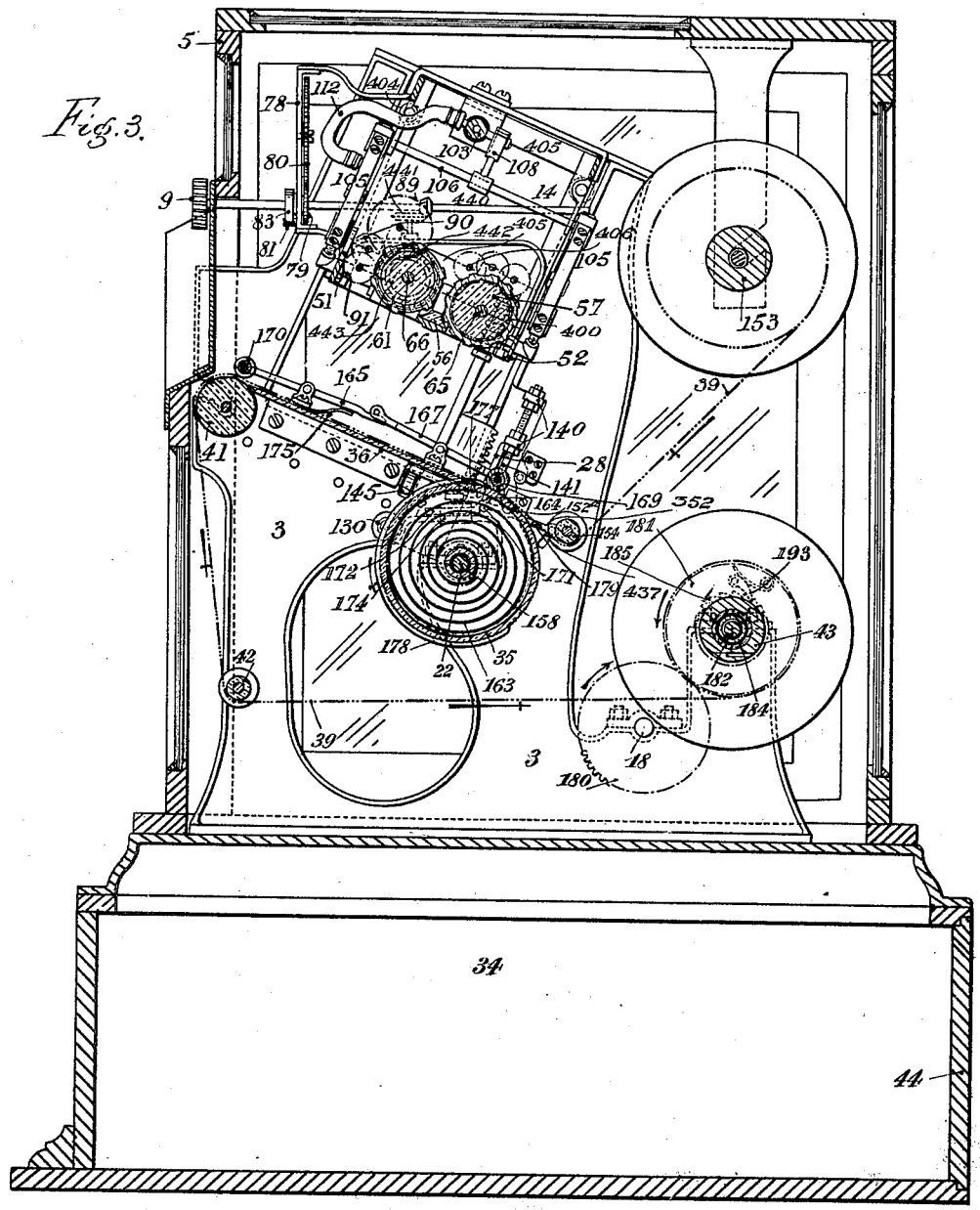

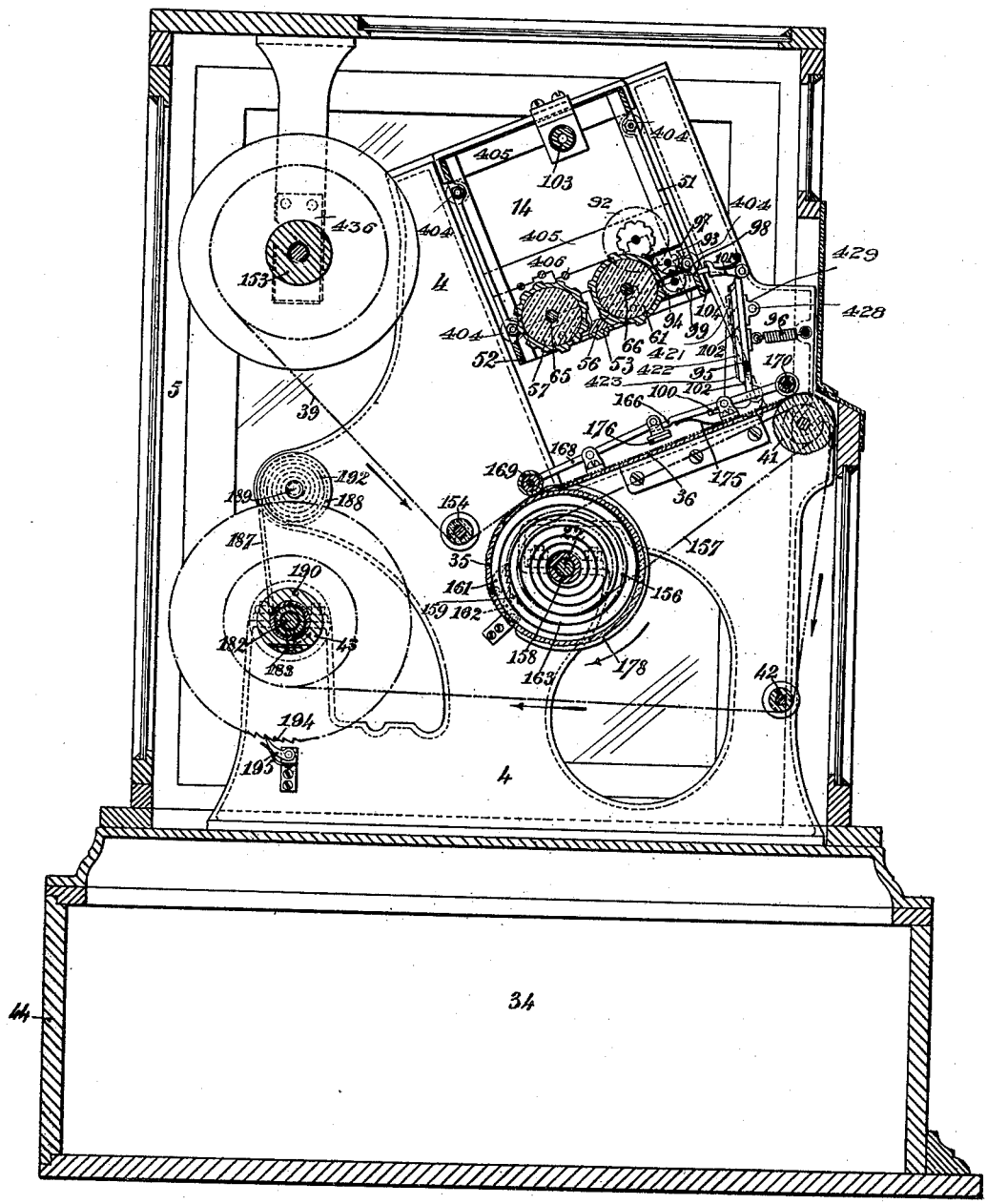

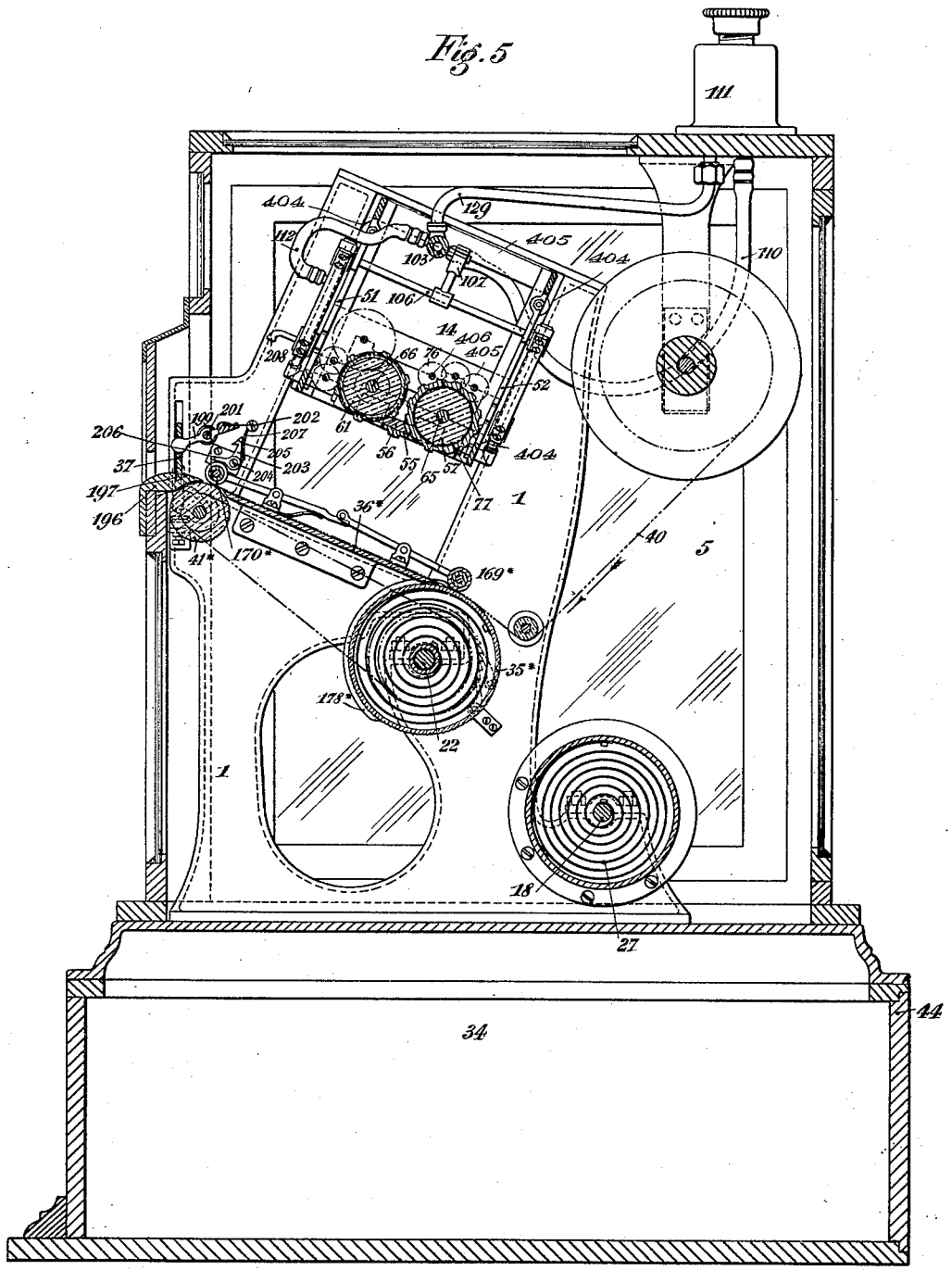

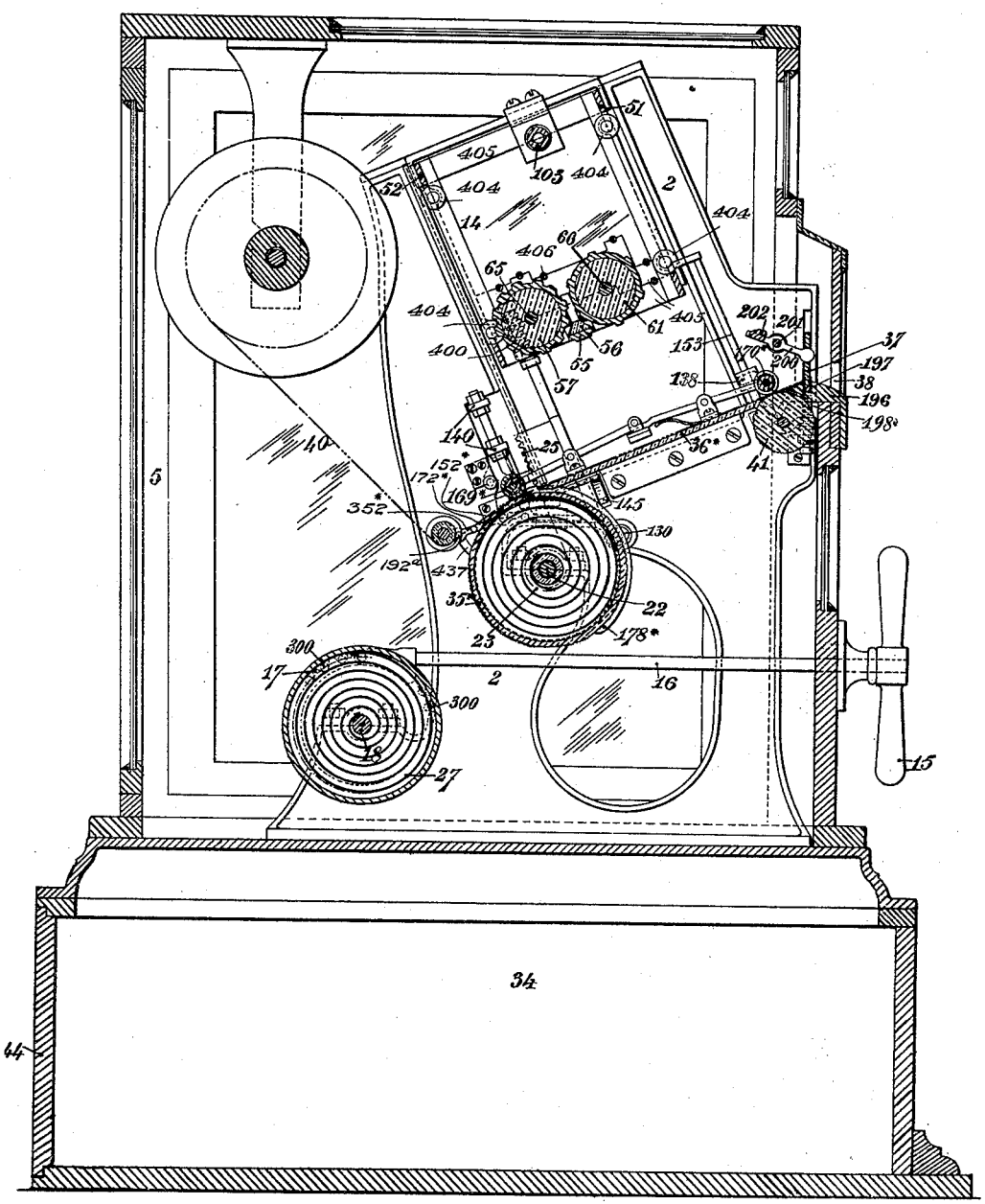

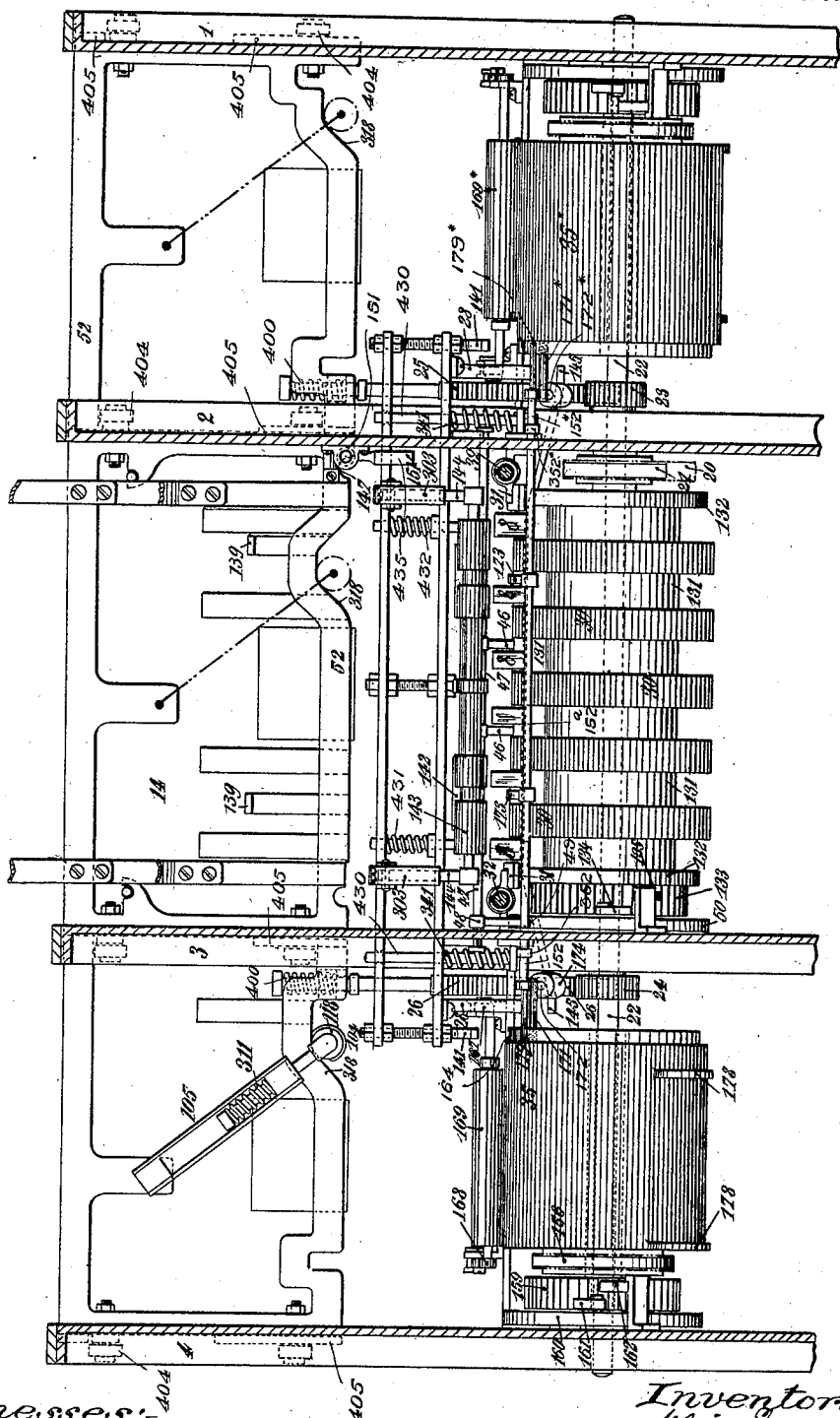

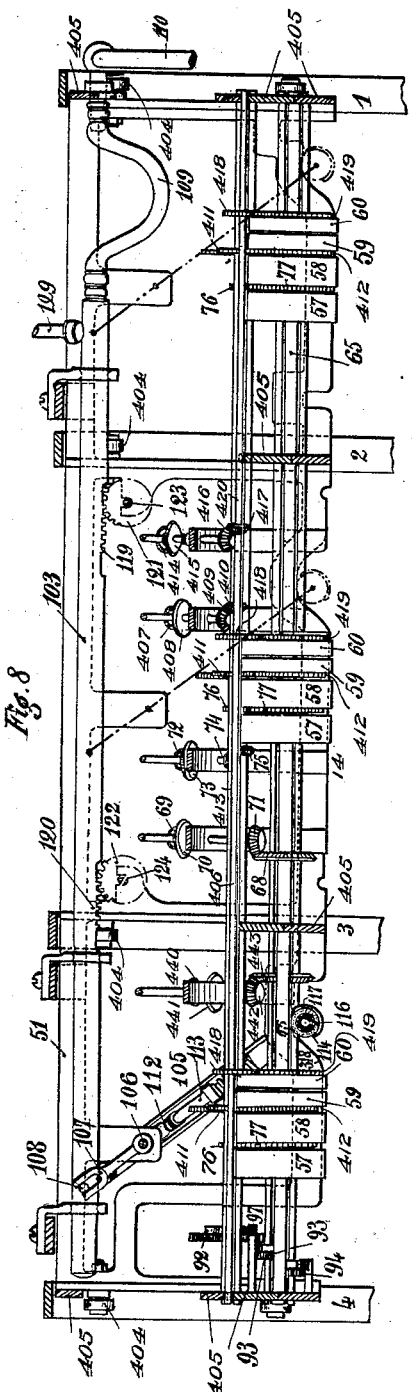

No. 692,512.  
A. FRANC & F. VOLAND.  
APPARATUS FOR AUTOMATICALLY INSURING, REGISTERING, AND FRANKING LETTERS.  
(Application filed Sept. 25, 1900.)  
(No Model.)

Patented Feb. 4, 1902.

12 Sheets—Sheet 10.

Witnesses:—
Henry Thieme
George Barry Jr.

Inventors:—
Alberic Franc
Francisque Voland
By attorneys
Brown & Seward

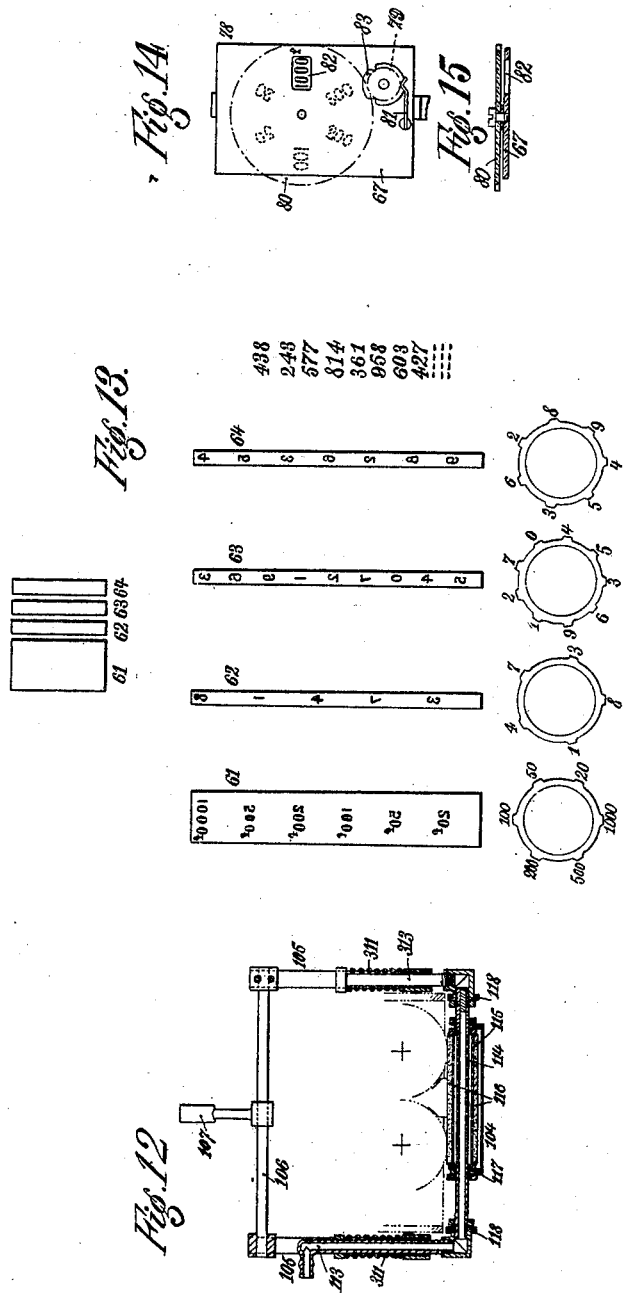

No. 692,512. Patented Feb. 4, 1902.
A. FRANC & F. VOLAND.
APPARATUS FOR AUTOMATICALLY INSURING, REGISTERING, AND FRANKING LETTERS.
(Application filed Sept. 25, 1900.)
(No Model.) 12 Sheets—Sheet 12.

Witnesses:-
Henry Thieme
George Barry Jr

Inventors:-
Alberic Franc
Francisque Voland
by attorneys
Brown & Seward

UNITED STATES PATENT OFFICE.

ALBERIC FRANC, OF SANARY, AND FRANCISQUE VOLAND, OF LYONS, FRANCE.

APPARATUS FOR AUTOMATICALLY INSURING, REGISTERING, AND FRANKING LETTERS.

SPECIFICATION forming part of Letters Patent No. 692,512, dated February 4, 1902.

Application filed September 25, 1900. Serial No. 31,080. (No model.)

*To all whom it may concern:*

Be it known that we, ALBERIC FRANC, clergyman, a resident of Sanary, Var, and FRANCISQUE VOLAND, manufacturer, a resident of 16 Rue Duquesne, Lyons, Rhône, France, citizens of the Republic of France, have invented new and useful Improvements in Apparatus for Automatically Insuring, Registering, and Franking Letters, of which the following is a specification.

This invention relates to apparatus for simplifying and accelerating postal service by permitting in particular the public to register or record the postage of or to insure their letters for themselves without the aid of any employee, and therefore without having to present themselves at a counter to be kept waiting more or less.

The principle of the apparatus for registering or insuring letters is this: The letter to which the necessary stamp has been attached is first introduced into the machine. A slide or analogous organ, such as a crank or push, is moved, giving rise to the following actions: The letter is marked by an inked printing-stamp and falls into a receiving-box, and at the same time the printing is repeated on a ticket, which is delivered to the person who actuated the machine and on a recording-band which is rolled up in the machine.

The essential parts of the apparatus are, first, a printing device for making identical marks on the letter, the ticket, and the recording-band; second, a device for conveying the letter thus marked to the receiving-box; third, a device for guiding and detaching from a band of paper the ticket to be delivered to the person who actuated the machine; fourth, a device for rolling on a roller the checking-band, and, fifth, devices for preventing tampering with the machine.

As an example of how the objects just set forth may realized a machine for the purpose will now be described, with reference to the accompanying drawings, it being understood that the invention is not limited to the arrangements shown and described, for these may evidently be varied within wide limits without departing from the essence of the invention.

Figure 10:
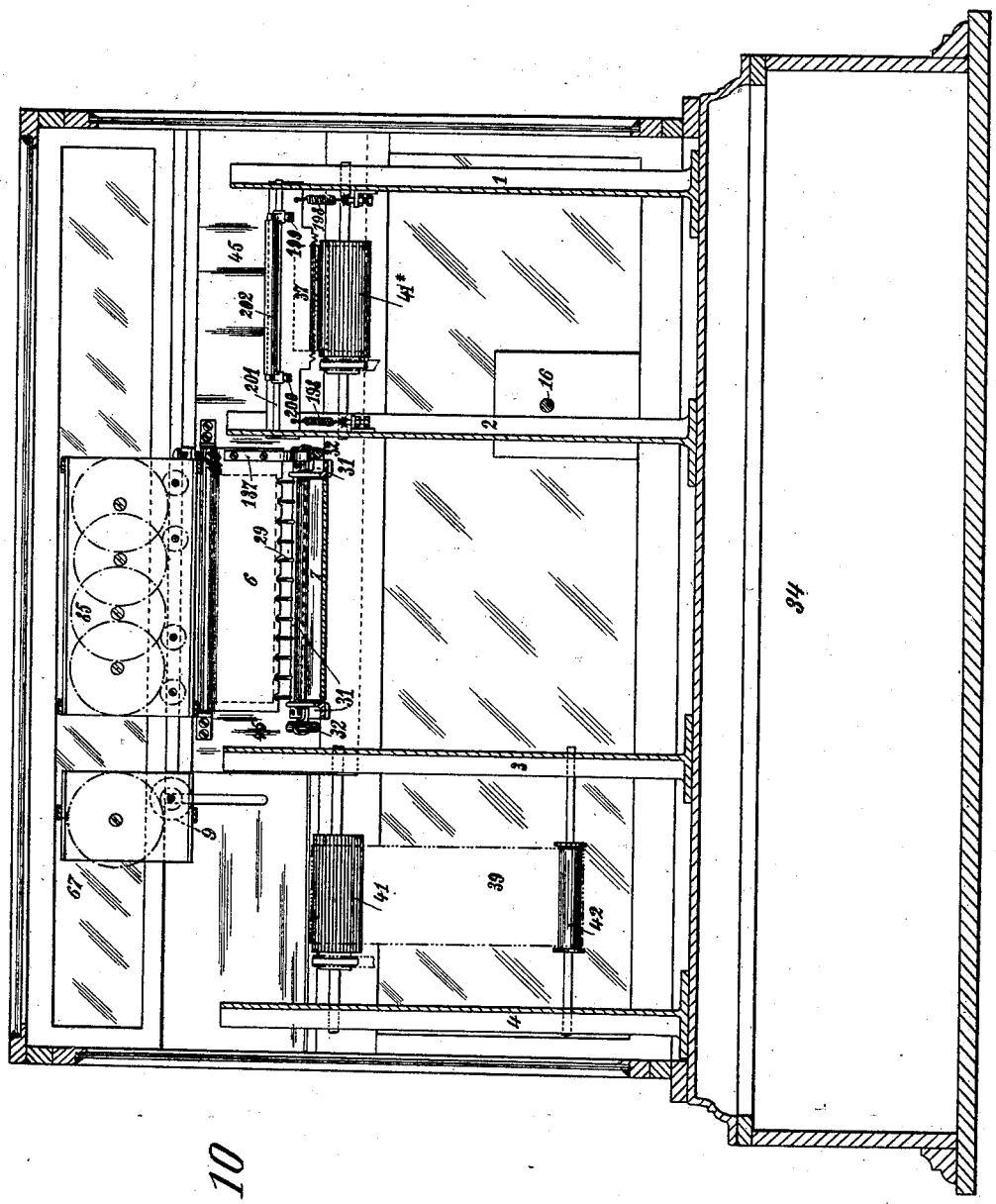
Figure 11:
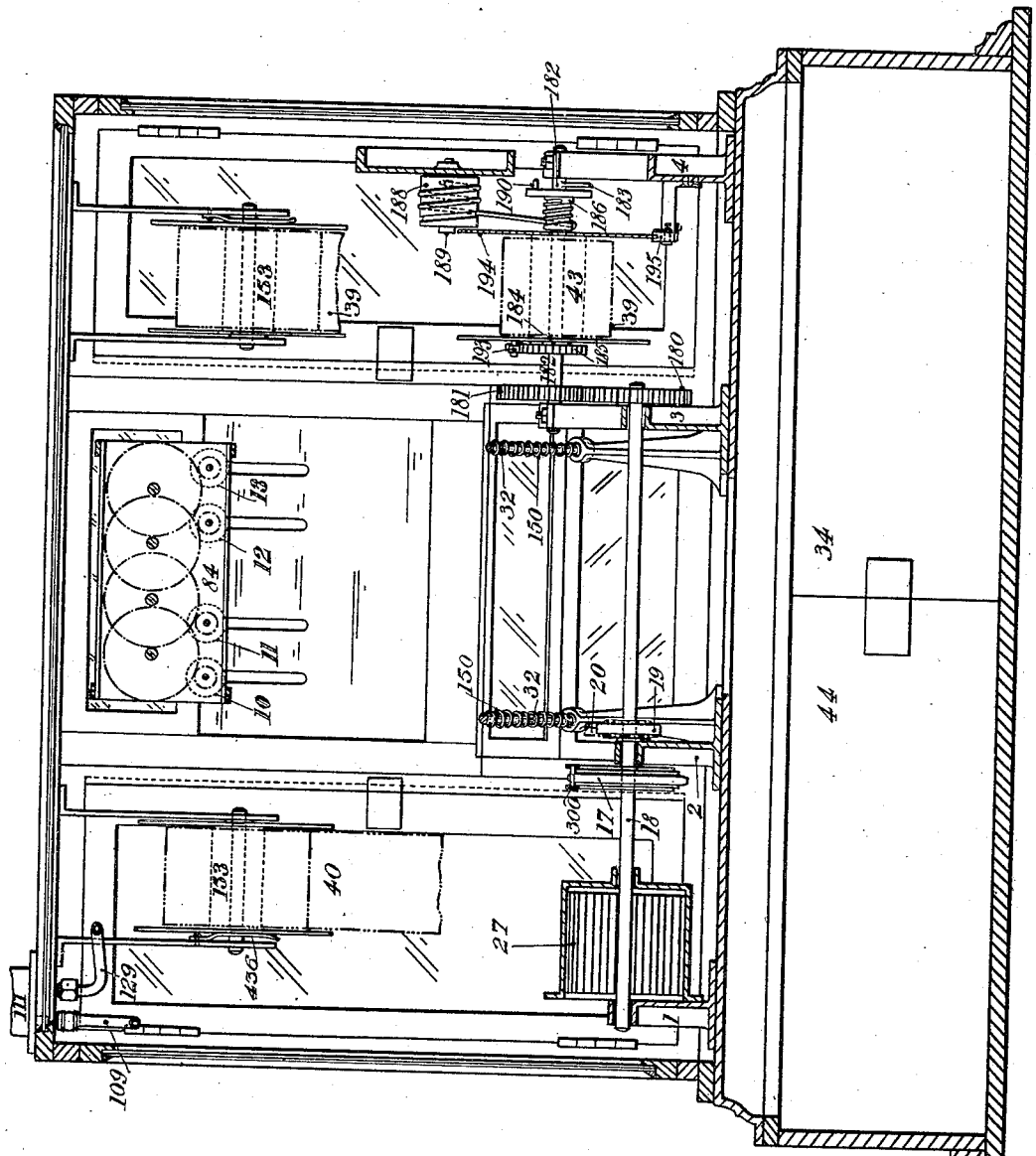
Figure 17:
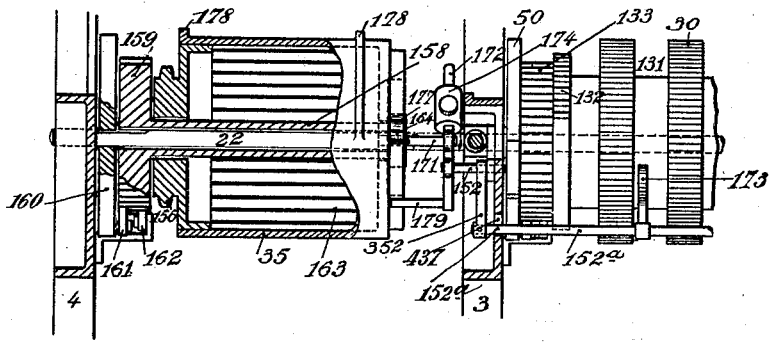
Figure 18:
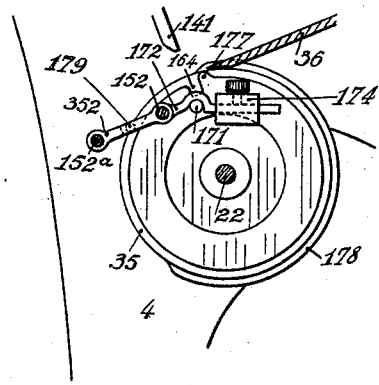

Figures 1 and 2 are transverse vertical sections through the center compartment of the machine for recording and insuring—that is to say, through the part of the machine where the letter is received and marked. These sections are on the same vertical plane, the two figures representing opposite sides of the section. Fig. 1 is taken looking from the side which is to the right of the spectator placed in front of the machine—that is to say, the side to which the public has access. Fig. 2 is taken looking in the opposite direction. Figs. 3 and 4 are sections through the compartment where the recording-band is printed and rolled up, Fig. 3 being taken looking from the same side as Fig. 1 and Fig. 4 looking from the same side as Fig. 2. Figs. 5 and 6 are sections through the compartment where the ticket to be delivered is printed and detached, Fig. 5 being taken looking from the same side as Fig. 1 and Fig. 6 from the same side as Fig. 2. Fig. 7 is a longitudinal section, partly in elevation, on the line A B of Fig. 1, drawn to an enlarged scale. Fig. 8 is a longitudinal section, drawn to an enlarged scale, on the line C D of Fig. 1 of the printing device, the bar carrying the printing-stamps being removed. Fig. 9 is a similar section, drawn to an enlarged scale, on the line E F, and is prolonged through the tables on which the printing is effected. Fig. 10 is a longitudinal section on the line G H of Fig. 1 across the whole apparatus looking at the front thereof. Fig. 11 is a similar section looking at the back of the apparatus. Fig. 12 is a detail view showing a section of the mechanism for inking the printing devices. Fig. 13 shows elevations and developed views of the printing-wheels, which show, respectively, the amount of payment and the running number of the operation. At the extreme right hand of this figure is a portion of this latter series of numbers as they print themselves successively. Fig. 14 is an elevation of the dial-plate for registration and insurance as viewed by the public, and Fig. 15 is a horizontal section thereof. Fig. 16 is a vertical section through the ink-holder. Fig. 17 is a detail view, partly in horizontal section and partly in plan, intended to show specially the mounting of the cylinder on which passes the recording-band, as well as a particular mechanism to be hereinafter described; Fig. 18, a transverse vertical sectional view of said cylinder and mechanism.

Referring to Figs. 1 to 16, inclusive, the mechanism is supported on four vertical cast-iron or bronze brackets screwed to a base and dividing the apparatus into three compartments. The whole is inclosed in a casing 5. Each bracket has a wide rectangular slot in its upper part, and in these slots as guides slides the carriage 14, which carries the printing devices. The letter is introduced into the center compartment through an opening in the front wall of the casing ordinarily closed by a flap 6, which must be raised to insert the letter. The letter slides down an inclined table 7 and is stopped by the bent-up ends of the teeth of a comb 8, hinged beneath the table. In each side compartment is a band of paper 39 40, which unrolls from a drum 153 and passes over a table, where it receives, like the letter, an impression from the printing-wheels. These latter are actuated for giving the proper impression at each operation by gear operated by means of buttons on the outside of the apparatus, as will presently be explained.

The general action of the apparatus is as follows: When a letter has been introduced into the center compartment, the handle 15 of the slide, Fig. 6, is pulled, whereby the printing-wheel carriage 14 is caused to descend and the letter and two paper bands are simultaneously printed. At the same time the fingers 28, Fig. 7, depress the comb 8. The handle is then released, whereupon the grooved roller 30 rotates in the direction of the arrow, Fig. 1; but at this moment the lower edge of the letter is gripped between this roller 30 and a roller 142, so that the revolution of the former carries the letter onto an inclined surface 33, whence it falls into the box 34. The travel of the letter is insured by a sliding frame 31, Figs. 1 and 10, which moves down the guides 32 and is provided with teeth 29, which catch the top edge of the letter and push the latter before them if it has not already been properly caught and moved by the roller 30. While the letter is descending, the band of paper in the right-hand compartment, moved by the rotation of the rollers 35 and 41, Fig. 3, travels toward the front of the machine on a table 36 and, passing over roller 42, is wound up on drum 43. In the left-hand compartment the paper band 40, Fig. 5, which travels together with the band 39, passes under the knife 37, which the carriage 14 has raised by its descent and issues from the apparatus through the opening 38. At a given moment the knife is lowered, and the ticket detached is received by the person operating the machine.

The general functions of the machine having now been described, the details of its mechanism must be considered.

The wooden glazed casing 5 rests on the cast-iron base, which carries the brackets 1 2 3 4, which constitute the framework. Some of its sides have doors allowing access to certain parts of the apparatus. The cast-iron base rests on the wooden box 34, which receives the printed letters. At the back of this box is a door 44 for removing the letters.

A part of the front wall of the casing is constituted by a plate 45, in which is the opening for the introduction of letters. The flap 6 is hinged to this plate and is raised for insertion of the letter, which slides down the table 7. This table has a certain amount of spring for a reason presently to be explained, and the letter is guided on it by the ledges constituting the sliding frame 31, Fig. 10. When the letter is stopped by the teeth of the comb 8, the handle 15, Fig. 6, is drawn out in order to cause the carriage 14, with its printing-wheels, to descend. The mechanism for this purpose is as follows: The rod 16, Fig. 6, is attached to a chain 300, itself attached to the periphery of the chain-wheel 17, so that it passes around a portion thereof. This wheel is keyed to a shaft 18, which is geared through chain 20 and chain-wheels 19 and 21 with an arbor 22, Fig. 1. On the latter are keyed two pinions 23 24, which engage, respectively, with the movable racks 25 26, Fig. 7, united through springs 400 with the stamp-carriage 14 and guided by rollers 130, (shown in Figs. 3 and 6,) carried by the brackets 2 and 3. When, therefore, the handle 15 is pulled, the arbors 18 and 22 turn, and the pinions 23 and 24 cause the carriage 14 to descend for printing the letter and the paper band. The spring connection between the racks 25 26 and the carriage 14 (shown in Fig. 7) allows a slightly-longer movement of the racks than is strictly necessary, so that effectual printing may be insured. By this means wear of the printing devices is compensated, and the latter are applied to the objects to be marked with a pressure which is always constant.

An elastic support of the table 7, Fig. 1, allows said table to yield under pressure of the printing devices when the thickness of the letter renders such yield necessary. This elastic support is obtained in the following manner: At a certain distance below said table is a plate 401, bolted to the standards 2 and 3 of the framing. In this plate 401 are holes in which are guided upright rods affixed to the lower face of said table. Coil-springs 403, placed on these rods between the plate and the table, give to the latter the desired elastic yielding quality.

On the arbor 18 is fixed by one end a powerful coiled spring 27, Fig. 6, the other end of the spring being attached to a fixed barrel. When the handle is pulled, this spring is coiled up to such an extent that when the handle is released it uncoils to its original condition and reverses the movement of the arbors 18 22, thus moving up the racks 25 26, Fig. 7, and causing the carriage 14 to rise to its original position.

To avoid errors of printing on the bands 39 and 40, it is necessary that the handle 15 cannot be drawn out unless a letter has been introduced onto the table 7. This is managed as follows: Before it is caught by the hooked teeth of the comb 8 the letter encounters two small arms 46, Figs. 1 and 7, mounted on an arbor 47, pivoted in the brackets 2 and 3. Close to the bracket 3 and on the same arbor 47 is also mounted another small arm 48, the end of which when the apparatus is at rest is engaged in the notch 49 of a disk 50, keyed on the arbor 22, Figs. 2 and 7. When the arms 46 are pushed by the letter, they advance before it by turning with the arbor 47 until the letter passes under said arms, the lower extremities of which then rest upon it. In consequence of this turning of the arbor 47 the arm 48 is raised out of the notch 49. Thus it is impossible to work the apparatus unless a letter has been introduced, for until this has been done the arm 48 acts as a detent to the disk 50 and through this to the arbor 22 and handle 15.

The printing device consists of two metal frames 51 52, constituting the longitudinal frame of the carriage 14. These frames are connected by cross-plates at their ends and at the points where they cross the brackets 2 and 3. Thus the printing-carriage, like the apparatus itself, is divided, as it were, into three compartments. Friction-rollers 404 on the frame 51 52 of the carriage facilitate the movement of this in the slides formed by ribs on the brackets 1 2 3 4. The arbors on which the printing-wheels are mounted and the accessory arbors to be described presently are supported by the cross-plates 405 between the frames 51 52.

In the present example the marking to be impressed on the envelop and on the paper bands is divided into three lines. The first indicates the date and the number of the collection, the second the name of the town, and the third a special number accompanied by a number indicating the amount for which the letter is registered. For the second line, which is always the same, the printing-types 53 54 55 are attached to a copper plate 56, fixed to the end plates of the carriage 14, Fig. 9. For the first and third lines the markings are variable, so that there are required in each compartment two sets of printing-wheels, which are mounted on arbors 65 and 66. For the first line the wheel 57 has on its periphery the numbers of the collections, the wheel 58 the months, and the wheels 59 and 60 the numbers showing the dates of the month. For the third line the wheel 61 carries the figures showing the amount of the insurance or registration, and the wheels 62, 63, and 64 the figures showing the running numbers. The last-named wheels turn automatically to change the number each time the machine is actuated.

In what follows the word "registration" will be used to mean either the act of recording or the insurance in order to avoid repetition.

The recording-wheel is manipulated by the person registering a letter in the manner described presently. The date-wheels 57 58 59 60 are brought into the desired position by the buttons 10, 11, 12, and 13, which are arranged at the back of the apparatus and are operated by the employees of the office. Considering the printing-wheels 57, (N° of the collection,) these (one in each compartment) are keyed on the arbor 65, on which is also mounted the bevel-wheel 68, which is rotated by the button 13 through the gearing 69, 70, and 71. The printing-wheels 58, showing the months, are mounted loosely on the arbor and are controlled from button 12 through the gearing 72, 73, 74, and 75. The gear-wheel 75 is keyed on an arbor 406, which runs along the whole length of the carriage and carries also toothed wheels 76, which engage other wheels 77, carried by the printing-wheels 58. The printing-wheels 59, Fig. 8, are operated in the same manner by means of the button 11, Fig. 1, and through the pinions 407, 408, 409, and 410, the arbor 413, and toothed wheels 411 and 412. As to the printing-wheels 60, they are operated by the button 10, Fig. 11, through the pinions 414 415 416 417, Fig. 8, the arbor 420, and the toothed wheels 418 419. Printing-wheels 61 (recording) are operated similarly to wheels 57, being mounted fast on their arbor 66. This operation is obtained by means of the button 9, Fig. 3, through the pinions 440, 441, 442, and 443, Figs. 3, 8, and 9, the latter being keyed on the arbor 66; but the button 9 is at the front of the apparatus and can be turned by the public. By means of a dial 78, Figs. 3 and 14, fixed to the carriage 14 and visible from the outside, the person operating the machine can regulate exactly the position of the printing-wheels 61. For this purpose there is keyed on the rod operated by the button 9 a toothed wheel 79, which gears with a toothed disk 80. The number about to be printed by the printing-wheel 61 is thus recorded at the window 82 on the plate 67, behind which the disk 80 rotates. In this instance the disk 80 has six numbers and must turn one-sixth of a revolution while the next number on the printing-wheel 61 is being brought into position for printing. As the wheel 79 is of one-fourth the diameter of the disk 80, it must make two-thirds of a revolution. In thus turning the button, however, the operator is not only guided by the appearance of the numbers at the window 82, but there is provided a spring 81, which engages in one of three notches on a small disk 83, also mounted on the rod operated by the button 9. This disk 83, like the wheel 79, must make two-thirds of a turn for every change of number on the printing-wheel 61. It must therefore be turned until the spring has passed one notch and has engaged with the next before the next number on the disk 80 will appear at the window.

The operation of the dial 84, controlled by the buttons 10, 11, 12, and 13 on the employee's side of the machine, is similar to that just described. In order that the public can observe the indication of this dial, (date and number of the collection,) the rods operated by the buttons are prolonged across the carriage and actuate a precisely similar dial 85, Figs. 1, 2, and 10, on the front of the machine.

Next must be described the numbering mechanism for printing the control-number—that is to say, the ordinal number which is to be printed at the same time upon the letter, upon the ticket delivered to the person posting it, and upon the recording-band, which remains in the apparatus. The printing-wheels 62 63 64, the figures on which form this control-number, are provided, respectively, with toothed wheels 86 87 88, which engage with toothed wheels 89 90 91, respectively. These latter are mounted on arbors extending along the whole length of the carriage 14 and carry also toothed wheels 92 93 94, which control this mechanism and are of the same diameter as the wheels 89 90 91. In the present instance the printing-wheel 62 has five figures on its periphery, wheel 63 has nine, and wheel 64 has seven, and the arrangement is such that every time the carriage 14 ascends wheel 62 makes one-fifth turn, wheel 63 makes two-ninths turn, and wheel 64 makes three-sevenths turn. In other words, while the numbers on wheel 62 are printed successively every other one of wheel 63 and every third one of wheel 64 are printed at each descent of the carriage. The ratios between the toothed wheels are such that to turn the printing-wheels through the said angles the toothed wheel 92 (and with it the wheels 89) must make one-ninth turn, the wheel 93 (and with it the wheels 90) must make one-half turn, and the wheel 94 (and with it the wheel 91) must make a complete turn. This rotation of the wheels 92, 93, and 94 is imparted to them by a triple rack 95 and occurs only during the ascent of the carriage 14. This rack 95 has three dentures 421, 422, and 423, with which are geared, respectively, the toothed wheels 92, 93, and 94. (See Figs. 4 and 9.) As the wheel 92 should accomplish one-ninth of a revolution, the length of the corresponding denture 421 is equal to one-ninth of its primitive circumference. For an analogous reason the length of the denture 422 is equal to half of the circumference of the wheel 93 and that of the denture 423 to the entire circumference of the wheel 94.

As will be seen from Figs. 4 and 9, the triple rack 95 is pivoted to the bracket 4 and is under the action of a spring 96, which draws it backward, this movement being limited by a pin 428, which engages in a slot 429 in the bracket. The wheels 92, 93, and 94 are stopped in their respective positions by the springs 97, 98, and 99, the hooks on which engage in the notches in the hubs of the wheels. The carriage 14 descends and the printing-wheels print the necessary marks. At the end of its course the carriage 14 encounters a projection 100 of the rack and obliges the latter to move forward. The upper edge of the rack during this movement forward raises a pawl 101, which yields, but being under the action of a spring catches behind the rack as soon as it is free therefrom and keeps it in the position proper for its engagement with the toothed wheels. When the carriage ascends, the springs 97, 98, and 99 come in contact with the inclined planes 102, which are alongside the racks, and are thus bent so that their hooks are disengaged from the notches on the wheels 92, 93, and 94, and the latter are set free and are actuated by the teeth of the rack. Thus the printing-wheels 62, 63, and 64 are turned, as has been explained. The boss 104 on the carriage 14 now raises the pawl 101, so that the rack is liberated and is drawn back by its spring 96. The hooks of the springs 97, 98, and 99 again engage with the notches of the toothed wheels, and thus the printing-wheels are held ready for the next operation.

There has now to be described the device for inking the printing-wheels. Generally speaking, it consists of a tube 103 and three inking-rubbers, which during the movements of the carriage 14 pass under each of the series of printing-wheels. Each of these rubbers consists of an inking-roller 116, turning on a hollow axle 114, Fig. 12. At the two ends of this axle are fixed the rods 113 and 313, capable of sliding in the arms 105 and pushed upward by the springs 311. The arms 105 are carried by an arbor 106, journaled in the frames 51 52 of the carriage 14. On this arbor is fixed a fork 107, which embraces the pin 108, fixed on the tube 103. This tube 103 is in communication through flexible pipes 109 and 110 with an ink-holder 111, from which ink is supplied. From the tube 103 the ink is distributed to each of the rubbers by a flexible pipe 112, Fig. 5, through the hollow rod or pipe 113 and the hollow axle 114, which is perforated. The ink next passes into a perforated metal cylinder 115, surrounding the axle 114, and is finally absorbed by the material of the rubber 116. A casing 117, which partly surrounds the rubber 116, receives any excessive ink which may drip from the rubber. When the machine is at rest, each rubber is in the position shown in Figs. 7, 8, and 9—that is to say, they are situated at the sides of the printing-wheels in such a way that they are out of action. As is seen in Fig. 12, the elbow-joints which unite the hollow axle 114 with the rods 113 and 313 are provided with rollers 118, which are ordinarily held against the underneath surface of the lower bars of the frames 51 and 52 of the carriage 14 by means of the springs 311. (See Fig. 7.) During the descent and ascent of the carriage 14 the rubbers are oscillated in such a manner that the three waste surfaces are rolled across the lower parts of the printing-wheels, so as to ink these. When the rubber leaves the position shown in Fig. 7, the rollers 118 roll down the inclined plane 318 on the lower bars of the frames 51 and 54. In this way the rubber 116 comes underneath the printing-wheels and continuing its motion passes across them, sufficient contact being assured by the tension of the springs 311. The rubber then returns to its original position by the same road. To oscillate the rubbers in the manner just described, it suffices to reciprocate the tube 103, with which, it will be remembered, the whole framework of the rubbers is engaged in a movable manner. For the purpose of reciprocating the tube 103 this is provided at two parts of its length with racks 119 120, which engage with toothed wheels 121 122, carried on arbors 123 124. These arbors also carry, respectively, outside the carriage 14, toothed wheels, such as 125 and 126, Figs. 2 and 9, which engage with racks 127 and 128, fixed to the brackets 2 and 3, in the following manner: When the descent of the carriage 14 begins, the rack 128 engages with the pinion 126 and turns it. The pinion 122 follows this movement and moves the tube 103 toward the left when one is looking at the front of the apparatus. The rubbers are thus moved in the opposite direction and pass under the printing-wheels. As the descent of the carriage continues the pinion 126 leaves the rack 128, and thereupon the pinion 125 engages with the rack 127, so that the reverse movement of the tube 103 occurs and the rubbers return to their original position. When the carriage ascends, the same movements occur and the rubbers again pass under the printing-wheels. The ink only flows through the holder 111 into the tube 103 while the machine is at work, for it is obvious that the inking-rubbers need not be fed when the printing-carriage is at rest. To this end the ink-holder is hermetically closed and is provided with a slightly flexible air-admission tube 129, Fig. 5, one of the extremities of which opens in the holder above the surface of the liquid. When the carriage 14 comes to this position of rest, the tube 103 closes the lower orifice of the tube 129, and thus prevents entrance of air into the holder, so that the flow of the liquid therefrom ceases.

Returning to the description of the general arrangements, attention will first be paid to the central compartment. It is evident that in order to avoid fraud it is necessary that it should not be possible to withdraw the letter through the admission-opening when once the letter has been introduced, particularly when it has been marked. The two devices described below achieve this result.

First. As has already been stated, when the handle 15 is released a frame 31 advances toward the right, Fig. 1, and, if necessary, pushes the letter before it by means of its teeth 29. These teeth also prevent the letter from being fraudulently withdrawn, for when this is attempted the letter catches against the teeth and is held fast.

Second. The flap 6 is held closed from the time when the carriage 14 has reached a certain point in its descent until it has nearly completed its ascent. This prevents not only fraudulent withdrawal of a letter already marked, but also the introduction of another letter before the parts of the machine have recovered their normal position of rest. This closure of the flap 6 is effected as follows: The carriage 14 carries an adjustable projection 136, which when the carriage descends bears against a spring-arm 137, carried by the flap 6. This arm then presses on the beveled end of a spring-pressed catch 138 and presses aside said catch; but as soon as the arm has arrived at the bottom of the catch this springs back and hooks over the arm in such a way as to keep the flap 6 closed. The movement of this catch 138 is identical with that on a swing-door. This catch 138 is guided in a piece 424, carried by the framing, and it receives the action of a spring 425, Fig. 9. It has in it a mortise in which passes a bar 155, which is affixed to the carriage 14, and presents a narrow part 426 and a reinforced part 427, and the mortise in the catch has the dimensions of the latter. When the carriage 14 descends, the narrow part 426 of the bar 155, being in the mortise of the catch, does not oppose the movement of the latter toward the left, Fig. 9; but at the end of the rising movement of the carriage the reinforced part 427 arrives in the mortise and acts as a cam to push the catch 138 to the right, and thus disengage the arm 137. The flap 6 may then be opened for the introduction of a new letter.

The next point for explanation is how the passage of the letter after it has been marked is insured. It has already been said that this passage is effected by the roller 30. This roller is loosely mounted on the arbor 22. It is slightly grooved for better taking hold of the letter. It has channels 131, into which the hooked teeth of the comb 8 are allowed to be depressed in order to disengage the letter. The roller 30 is provided with a ratchet-wheel 133, with which engage two pawls, the one, 134, carried by the disk 50, the other, 135, carried on the bracket 3. When the handle 15 is pulled, the movements already described turn the disk 50 in the direction indicated by the arrow in Fig. 2; but the pawl 134 passes over the teeth of the ratchet-wheel 133, which is kept at rest by the pawl 135. On the contrary, during the reverse movement of the disk 50 the pawl 134 engages the teeth of the ratchet 133, and in consequence the roller 30 moves in order to pass on the letter. The roller 142, which is covered with caoutchouc, is also concerned in the passage of the letter, as has been already stated. In order that this roller may not prevent the introduction of the letter, it must be raised from the roller 30 at the moment when the letter is introduced. The roller 142 is carried by a frame 140, Figs. 1, 2, and 7, constituted by two horizontal bars interbraced at three points in their length. This frame is guided in its movement of descent by upright rods 430, mounted on brackets affixed to the standards 2 and 3 of the frame. Springs 341, coiled on these rods 430, support the frame 140 and keep the latter raised at ordinary times. When the carriage 14 descends, the projections 139, Fig. 1, which it carries, bear upon the frame 140 and depress it, so that the roller 142 comes in contact with the letter. As may be seen in Figs. 1 and 7 of the drawings, this roller is mounted elastically in the frame 140 owing to the springs 431 432 in such manner that the action which they have on the letter may be a constant elastic pressure. When the frame pushed by the projections 139 has arrived at the end of its movement, compressing the springs 341, a spring-pressed catch 151 takes over the upper bar of the frame 140 and prevents this from ascending again. This catch 151 is constituted by a rod which slides horizontally in lugs on the framing. This rod is subjected to the action of a spring 434, Fig. 1, and it carries a tail 435, intended to pass over the frame 140. When the frame 14 is at rest—that is to say, in its upper position—a projection 147, with which it is furnished, acts as a cam to hold the catch pressed back. (See Fig. 1.) From the commencement of the movement of descent the projection 147 by passing by it liberates the catch; but the latter does not yet move, for its tail 435 is retained by the upper bar of the frame 140, against which it is pushed by the spring 434. It is not until the frame arrives at the end of its course, pushed, as has been above mentioned, by the projection 139, that the catch is really liberated. Its tail 435 under the impulse of the spring 434 passes then over the frame 140 and holds it depressed. When the frame 14 rises again, its projection 147 again pushes back the catch 151. The frame 140 is again liberated and is raised to its upper position by the spring 341 in such manner that the roller 142 is again raised from the cylinder 30.

It will be remembered that in order to allow the letter to advance, the teeth of the comb 8 must be depressed. This movement is derived from the frame 140, to which are fixed fingers 28, and these during the descent of the frame bear on the arms 145, which project laterally from the comb 8. This being hinged at 301 under the table 7 is depressed against the spring 146, and thus liberates the letter after the roller 142 has come in contact with it. The letter is then held in place for receiving the impression of the printing-wheels. When the frame 140 ascends again, the spring 146 pushes up the comb 8 to its original position.

As already stated, the frame 31 advances together with the letter, and this movement is produced as follows: The roller 30 carries at each end a collar 132, provided with teeth on a portion of its periphery. When the roller begins to turn, these teeth engage with the racks 433, which are underneath the frame 31. The latter therefore advances toward the right, Fig. 1. It is guided in this movement by the flanges 149, with which it is provided and which take over long rods 32, fixed to the frame of the machine. As the frame 31 advances on its guides it compresses the springs 150, which surround the rods 32. When the frame 31 has advanced far enough, the parts of the collars 132 which do not bear teeth come opposite the racks 433, so that the frame is now disengaged and is thrust back to its original position by the springs 150.

The details of the right-hand compartment in which the paper band 39 is printed must now receive attention. The drum 155 is submitted to the action of a spring which rubs against the bracket in such a manner that the unrolling of the band cannot take place more rapidly than is required, so that the band 39 is always stretched. The band passes first under the guide 154, then over the feeding-roller 35 and the table 36, then over a second feeding-roller 41, over another guide-roller 42, and finally it is wound up on the drum 43. The feeding-roller 35 has a pulley 156, which transfers motion through a band 157 to a roller 41. The roller 35 is mounted loose upon a sleeve 158 on the arbor 22. On the same sleeve is a ratchet-wheel 159, with which engage two spring-pawls, the one, 161, of which is pivoted to a disk 160, keyed to the arbor 22, while the other, 162, is pivoted to the frame of the machine, as shown in Figs. 7 and 17. The roller 35 is hollow and contains a spring 163, fixed at one end to the interior face of the roller and at the other end to the sleeve 158. The roller 35 also has around two-thirds of its periphery ribs 178 and on that end of it which faces the central compartment a notch 164, designed to receive a beveled pin 141 on the frame 140. Centered in supports on the table 36 are levers 165 166 167 168, these being on each side of the paper band to be printed. Each carries at one end a small roller 169 170, covered with india-rubber, the former resting on the roller 35 and the latter on the roller 41. The free ends of the arms 167 and 168 are in the form of a fork, and on a pin which passes across this fork rest the ends of the other arms 165 and 166. Springs 175 compel these ends to remain raised and keep at the same time a small pad 176, carried by the pin of the arm 168, raised. In the end of the roller 35 is screwed a pin 171, Figs. 3, 7, 17, and 18, which is engaged by a hooked lever 172, which is fixed upon a small arbor or pivot 152, mounted in the standard 3 in such manner as to be capable of turning. On the pivot 152 is also fixed an arm 352, which is connected by a rod 152ᵃ with the corresponding arm 352* (see Figs. 6 and 7) of the other lateral compartment, said arm 352* being itself mounted in a pivot 152*, mounted in the standard 2, as the pivot 152 is in the standard 3. The two pivots 152 152* form, with the arms 352 352* and the rod 152ᵃ, a shaft of which the part 352 152ᵃ 352* is bent to enable it to pass into the central compartment without encountering the roller 30. On the central compartment the rod 152ᵃ is furnished with two small bent fingers 173, (see Figs. 1, 2, 7, and 17,) and it passes into curved grooves 437, Figs. 1, 2, 3, 6, and 17, provided in the two standards 2 and 3 of the framing, which permit it to turn at the desired moment about the axis formed by the pivots 152 152*. Upon the lever 172 is mounted an adjustable counterweight 174 in such manner that all the system which turns upon the pivots 152 152* may be suitably balanced and that a light pressure upon the fingers 173 suffices to raise the hooked lever 172 from the pin 171. The operation of all this mechanism is as follows: When the handle 15, Fig. 6, is drawn, the shaft 22 turns, as has been described, and with it the disk 150, Figs. 7 and 17. The latter, owing to the pawl 161, drives in its rotation the ratchet-wheel 159 and the sleeve 158, Figs. 3 and 17, and thus winds the spring 163. During this time the roller 35 remains stationary, being stopped by its pin 171, which is retained by the hook of the lever 172. At the same time the frame 140 descends and its beveled finger 141 enters into the notch 164 of the cylinder 35, Fig. 18. During this movement the beveled part of the finger acts upon the inclined left-hand inclination of the notch, Fig. 18—that is to say, on the right-hand edge of said notch shown in Fig. 3—in such manner as to turn the cylinder 35 slightly in a direction the reverse of the arrow in Fig. 3. It thus results that the pin 171 ceases to press upon the hook of the lever 172, and thus permits the arbor 152 to turn easily. Now it may be seen that when the handle is drawn the roller 30 of the central compartment begins to turn and draw the letter the latter passes over the fingers and pushes them downward, which obliges them to turn, with the rod 152ᵃ and the arms 352 352*, about the axis 152 152*. It thus results that the hooked lever 172 rises, and thus completely disengages the pin 171. The roller 35 is always tending to turn, under the action of the spring 163, in the direction of the arrow, Fig. 3, when it is not retained by the pin 141—that is to say, as soon as the frame 140 ascends. When this happens, the roller 35 turns and carries with it the roller 41. The paper band 39, which is kept in contact with the rollers 35 41 by the rollers 169 170, respectively, is thus moved in the direction indicated by the arrow, Fig. 3. It has already been explained that when the handle 15 is released the arbor 22 is turned under the action of the spring 27. This movement is in the opposite direction to that of the roller 35—that is to say, in the direction the reverse of that shown by the arrow in Fig. 4. During this movement of the arbor 22 the pawl 161 passes over the ratchet-wheel 159, which is kept stationary, as well as the sleeve 158, by the retaining-pawl 162. As already seen, the disengagement of the hooked arm 172 is produced by the letter during its descent after it has been marked. When, therefore, this operation has once been effected, and in spite of the safety devices already described an attempt should be made to withdraw the letter through the opening, the hooked bar 172 would not be disengaged and the band 39 would not advance after the handle 15 had been released. What has been said with regard to band 39 applies equally to band 40, which is subjected to the action of a similar mechanism. It is therefore necessary that the letter in advancing should have fully moved the arms 173. For this purpose there is fixed to the frame 140 by arms 144, acted upon by springs 303, Fig. 2, a roller 143 vertically above the arms 173. When the frame descends, the roller 143 descends with it on the curved plate 33, but does not move the arms 173, because it has annular channels, into which these arms can enter. When the letter comes along, it is obliged to pass between the roller 143 and the plate 33 in such a way that it is compelled to move the arms 173, which are thus depressed until after the disengagement of the rollers 35 by the finger 141. This is because when the frame 140 begins to ascend the roller 143 remains for a moment resting on the letter, because the arms 144 during the descent have turned on their axis 304, and thus move away from the frame 140 and approach the frame again in the reverse direction under the action of the springs 303. It thus happens that while this movement of the arms 144 is occurring the roller 143 remains bearing upon the letter and rolls on it. The rollers 142, 143, and 170, which roll on the letter or the paper band freshly marked, are of reduced diameter at suitable parts, so that they do not bear on the printing and smear it. Reverting to the intermittent advance of the band 39, it is obvious that it must be stopped when the paper has advanced through a distance corresponding to the printing which it has received. For this purpose at the necessary moment the ribs 178 come beneath the roller 169 and raise it. The other end of the levers 167 168, to which this roller is attached, is thus depressed and correspondingly raises the opposite roller 170, while the small pressing-pad 176 bears upon the paper band. Thus the latter, being no longer pressed against the rollers 35 and 41 by the rollers 169 and 170, respectively, and being, moreover, clamped by the pad 176, is immediately stopped. When the roller 35 has made a complete revolution, the ribs 178 no longer act upon the roller 169, and this, with its fellow roller 170, once more descends; but by this time all the parts have come to their position of rest—that is to say, the spring 163 is uncoiled, and in consequence of the action of the counterweight 174 the hooking of the pin 171 by the hooked lever 172 takes place anew. Should it happen that the system 172 174 152 152ª, which is almost balanced, does not swing over of itself to produce this hooking, it may be compelled to do so by the small projection 177, formed on the roller 35 near the notch 164, which in its course encounters a pin 179 on the arm 172 and depresses the latter. Having passed over the guide-roller 42, the printed paper band is rolled up on the drum 43. To effect this, the said drum is under the action of a coiled spring 192, which tends to roll up the band in proportion as it is fed forward by the rollers 35 and 41 and keeps this band under a nearly constant tension. The spring 192 is wound up automatically each time the machine is actuated, and for this purpose it is connected by suitable means to the arbor 18. It is obvious that the diameter of the drum is constantly increasing, so that the annular rotation of the drum diminishes each time a new length of band is rolled upon it, so that if the spring 192 were to be wound up each time to the same extent its tension would ultimately become excessive. This is avoided by providing the arbor 18, which is actuated by the handle 15, with a toothed wheel 180, which engages with the toothed wheel 181, which is keyed on the arbor 182. At the other end of this arbor 182, near the bracket 4, is keyed also an arm 183. The middle part of the arbor 182 is surrounded by a sleeve 184, which carries at one of its ends a ratchet 185 and at the other a drum 186, having a helicoid groove. On the sleeve, between the ratchet-wheel 185 and the drum 186, is loosely mounted the drum 43. The left-hand head of the bobbin carries the pawl 193, which engages with the ratchet 185, while the right-hand head is constituted by a ratchet-disk 194, with which engages a pawl 195, pivoted to the frame. On the drum 186 is coiled a cord 187, the other end of which is coiled on a drum 188, turning on an axis 189, fixed to the frame. This spring 192 is within this drum and tends to turn it with itself; but the cord 187 keeps it stationary, thus keeping the spring wound up so long as the paper band is not moved forward by the rollers 35 and 41. In fact, under the action of the spring 192 the cord 187 tends to turn the sleeve 184, and by the intermediary of the ratchet-wheel 185 and the pawl 193 the drum 43 moves in the direction necessary for winding up the band. It is obvious, however, that this movement can only occur in so far as the band can advance, since the tension of this band counterbalances the action of the spring 192.

The function of the foregoing parts is as follows: When the arbor 18 is turned by pulling the handle 15, the toothed wheel 180, Fig. 3, moves in the direction indicated by the arrow and actuates the wheel 181, as well as the arbor 182 and the arm 183. The latter as it is turned encounters a pin 190, fixed to the drum 186. It thus carries this drum, the sleeve 184, and the ratchet-wheel 185 with it. Now the drum 43 being retained by the pawl 195 cannot be rotated by the sleeve moving in this direction, for the pawl 193 slides over the teeth of the ratchet 185. By the rotation of the drum 186 in the direction of the arrow in Fig. 4 the cord 187 is wound up on it and unwound from the drum 188, thus winding up the spring 192. When the handle 15 is released, the arm 183 returns to its original position. At the same time the rollers 35 and 41 feed forward the paper the spring 192 turns the drum 186 and the drum 43. The pin 190 then approaches the arm 183; but it does not generally travel right up to it, because the drum 43 only turns sufficiently for that when its diameter is a minimum. Suppose, for example, that the arm 183 makes five-sixths of a revolution and that at this moment the drum need only turn four-sixths of a revolution in order to wind up the length of the band fed forward by the rollers 35 and 41. When the drum stops, the pin 190 is still distant from the arm 183 by one-sixth of a revolution. When next this arm turns, therefore, it makes one-sixth of a revolution without engaging with the pin, which it subsequently turns through four-sixths of a revolution only. Thus the rewinding of the spring 192 is always exactly equal to its preceding unwinding, which is the required condition. Moreover, the winding up of the spring-band can occur even after the arbor 182 has stopped. Of course in this example the five-sixths of a revolution has only been chosen as an example. The angle is changeable by changing the gear-wheels 180 and 181.

In the left-hand compartment of the machine the advancement of the paper-band on the printing-table is exactly the same as that which has just been described for the right-hand compartment; but here instead of being rolled up on a drum the band has to be issued from the machine and cut off to form a ticket for the operator. The knife for this purpose is constructed as follows: The blade 37 is arranged vertically between the brackets 1 and 2 of the frame and is guided in grooves therein. The cutting edge of this blade is provided with teeth and engages in a groove 197 on a small fixed table 196 in one piece with the plate 45. The springs 198 tend to make the blade descend to the bottom of the groove. At two points the blade 37 has holes in which engage the ends of the arms 199 200, which are pivoted at their middles to an arbor 201, carried by the frame. The arms 199 200 are united by a bar 202, so that they move as one. Behind the arm 199 is pivoted at 204 a lever-catch 203, carrying an arm 206, which is pressed by a spring 207 onto the roller 170×, Figs. 5, 6, and 9. When the printing-carriage 14 descends, a projection 208 thereon encounters the bar 202 and depresses it. The extremities of the arms 199 200 are thus raised and the knife ascends in its grooves. It remains in this position even when the carriage begins to ascend after having effected the printing, because the arm 199 engages beneath the hook 205 and remains stationary. While the carriage is ascending the band of paper on the table 36× is advanced and passes over the groove in the table 196 and out of the apparatus through the opening 38. At the necessary moment the ribs 178× of the roller 35× raise the rollers 169× and 170× and stop the advance of the paper. When the roller 170× is raised, it carries with it the catch 203, the hook 205 of which ceases to pull the bar 202. It follows that the blade 37 is quickly brought down into the groove 197 by the springs 198, and the band of paper is cut.

We claim—

1. A machine for registering or insuring letters automatically, comprising a stamping device for imprinting identical indications on the letter and on two bands of paper; a device for holding the letter while it is being marked and then advancing it into a receiving-box; a device for holding each of the bands of paper while it is being marked and for then feeding it forward; a device for rolling up in the machine the printed part of one of the bands; a device for causing the other band to issue from the machine and for cutting off the part printed; devices for preventing fraudulent manipulation and controlling mechanism for causing all these parts to operate in the desired order.

2. In a machine of the kind herein described, the combination of a carriage 14, a numbering apparatus carried by said carriage and comprising numbering-wheels 62, 63, 64, an automatic controlling mechanism for said numbering-wheels comprising the gear-wheels 86, 87, 88 fixed to the said numbering-wheels, the gear-wheels 89, 90, 91 engaging with the aforesaid gear-wheels and mounted on arbors which extend right along the carriage 14, which arbors also carry toothed wheels 92, 93, 94, a triple rack 95 pivoted to the frame of the machine and capable of imparting to the said wheels 92, 93, 94 suitable fractions of a revolution, while the carriage 14 is ascending and a device for causing the said rack to advance and recede from the said wheels 92, 93, 94 at the required moment.

3. In a machine of the kind herein described, the combination of a carriage 14, numbering-wheels mounted in this carriage, a movable rack 95, toothed wheels between said rack and the numbering-wheels for operating the latter, a device for causing said rack to approach and recede from the said gear-wheels comprising a traction-spring 96, keeping the said rack disengaged with the said wheels, the tail 100 fixed to the said rack and obliging it to move when the said tail is struck by the lower edge of the carriage 14; the spring-pressed finger 101 which keeps the rack against the tension of the said spring 96, and the projection 104 on the carriage 14, which projection disengages the finger 101 from the said rack allowing the latter to be pulled back by the spring 96.

4. In a machine of the kind herein described, the combination of a carriage 14, printing-wheels carried by said carriage, mechanism for operating said carriage comprising the handle 15, the chain-wheel 17 connected with this handle by the chain 300 and the rod 16, the arbor 18 carrying said chain-wheel, the arbor 22, transmitting-gear between these two arbors, the two pinions 23, 24 keyed onto the arbor 22, the racks 25 and 26 gearing with the said pinions and united elastically to the carriage, and the spring 27 which coils itself when the handle is pulled, and which afterward returns by the aforesaid mechanism to its original position.

5. In a machine of the kind herein described a device serving to hold the letter while it is being marked and then to advance it into a receptacle comprising the spring-table 7, the comb 8 for stopping the letter, the advancing-roller 30, a mechanism for imparting rotation to this roller after the marking has occurred, and a device for forcing the letter against the roller and depressing the comb 8.

6. In a machine of the kind herein described, the combination with a comb 8 for arresting the letter and an advancing-roller 30, of a device serving to force the letter against said roller 30 and to depress the comb 8, comprising the movable frame 140, the springs 341 for keeping said frame normally raised, the roller 142 and springs for supporting it on said frame, the fingers 28 carried by said frame, means for causing the frame to descend, and means for keeping said frame depressed during the advancement of the letter.

7. In a machine of the kind herein described, the combination of a carriage 14, printing-rollers carried by said carriage, a comb 8 for stopping the letter, an advancing-roller 30, a movable frame 140 and attached parts which as the frame descends depress the comb and force the letter against the advancing-roller, and devices for depressing said frame 140 and for keeping it depressed during the advance of the letter, comprising projections 139 carried by the carriage 14, a spring-catch 151 carried by the frame, and a projection 147 on the carriage 14 for disengaging the spring-catch 151 and permitting the raising of the carriage.

8. In a machine of the kind herein described, the combination of a manipulating-handle, a device for preventing this handle from being actuated unless the letter has been introduced, comprising an arbor 47, pins 46 carried on said arbor to be encountered and pushed forward by the letter at the moment of its introduction, an arbor 22 geared with the handle, a notched disk 50 on said arbor 22, and a pawl 48 attached to said arbor 47 and ordinarily engaged in the notch of the disk 50, but disengaged therefrom when a letter is introduced and moves the said pins 46.

9. In a machine of the kind herein described, the combination of a carriage 14, printing-wheels carried by said carriage, a case having an opening for the introduction of letters, and a device for preventing this introduction when the carriage 14 is not in its raised position, said device comprising the flap 6 provided with spring-arms 137, an adjustable projection 136 carried by the carriage 14, a spring-pressed catch 138, and a rod carried by the carriage 14 for coöperating with the catch to force it back.

10. In a machine of the kind herein described, the combination of a roller 30 for advancing the letter into a receptacle, and a device for preventing the withdrawal of the letter and assuring its advancement which comprises the sliding frame 31 provided with teeth 29, guide-rods for said frame, racks 133 on said guide-rods, springs 150 for pushing back the sliding frame, and disks 132 fixed on the roller 30 and provided with teeth on a portion of their peripheries.

11. In a machine of the kind herein described, the combination of a stamping device for printing identical indications on the letter and on bands of paper, a device serving to hold one of these bands of paper while it is being printed and then to feed it forward, comprising a feeding-roller 35, a table 36, a second feeding-roller 41, a mechanism for pressing the band of paper against these feeding-rollers when the feeding is produced and for keeping the band stationary when the feeding is terminated, and mechanism for rotating said rollers 35 and 41.

12. In a machine of the kind herein described, the combination of a printing device for imprinting identical indications on the letter and on bands of paper, a device serving to hold the band of paper while it is being printed and then to feed it forward, comprising a table 36, feed-rollers 35 and 41, a mechanism for rotating these rollers and a mechanism for pressing the paper band against the feeding-rollers when the feeding is to be produced and for holding it stationary when the feeding is terminated, such mechanism comprising the ribs 178 formed on a part of the periphery of the said feeding-roller 35, the lever-arms 165, 166, 167, 168, the rollers 169, 170, the pressing-pad 176 carried by the said lever-arms and the springs 175 keeping the rollers 169, 170 against the feeding-rollers substantially as described.

13. In a machine of the kind herein described, the combination of a manipulating-handle, a stamping device operated by said handle for imprinting identical indications on a letter introduced into the machine as well as on bands of paper, rollers 35 and 41 for feeding said bands, a mechanism for rotating said feed-rollers which comprises a sleeve 158, a pawl mechanism for uniting the sleeve to the said handle, and a coiled spring 163 uniting the roller 35 to the said sleeve, a return-movement mechanism uniting the roller 35 to the roller 41, and a retaining device for preventing the rotation of the feeding-rollers.

14. In a machine of the kind described herein, the combination of a carriage 14 and a printing device carried by said carriage for printing identical indications on a letter and on two paper bands with a device serving for advancing the letter after it has been marked having a movable frame 140 with a device serving for feeding forward each band of paper after it has been marked having a roller 35 under the action of a coiled spring 163, of a retaining device for preventing the rotation of the roller 35, comprising the pin 171 fixed to the said roller 35, the hooked arm 172 carried by the arbor 152, the arms 173 also carried by the said arbor 152, the roller 143 connected with the frame 140 by the spring-arms 144 and serving to press the letter against the said arms 173 in order to depress these arms and cause the said arm 172 to oscillate, the notch 164 in the roller 35 and the beveled pin 141 carried by the frame 140 and engaging in this notch when the frame descends, substantially as and for the purpose set forth.

15. In a machine of the kind herein described, the combination of a printing device for printing identical indications on a letter and on two bands of paper, a mechanism for rolling up the printed band 39 comprising the arbor 182 united by gearing to a handle, the arm 183 fixed on the said arbor 182, the sleeve 184 mounted loosely on the said arbor 182 and carrying at one of its ends the ratchet-wheel 185 and at the other the drum 186 provided with a pin 190, the drum 43 mounted loosely on the sleeve 184 and carrying a pawl 193 as well as a ratchet-wheel 194 with which engages a pawl 195 pivoted to the frame of the machine, the spring-barrel 188 and the cord 187 connecting this barrel with the drum 186, substantially as and for the purpose set forth.

16. In a machine of the kind herein described the combination with the carriage 14 carrying the printing device for printing identical indications on a letter and on bands of paper with the device for feeding each band of paper comprising the feeding-rollers $35^\times$ and $41^\times$ on which rollers the band is pressed by the rollers $169^\times$ $170^\times$ with means for lifting these rollers from the said feeding-rollers $35^\times$ $41^\times$ and with a movable blade 37 for cutting off the printed part of one of the bands, of a device for moving said blade comprising springs 198, arms 199, 200 and a connecting-bar 202 pivoted on a fixed rod 201 and engaging with said blade, the hooked lever 203, the arm 206 of which bears under the action of the spring 207 on the roller 170<sup>x</sup> and the projection 208 carried by the carriage 14 for depressing said bar 202 and thereby raising said blade, all substantially as and for the purposes described.

In testimony that we claim the foregoing as our invention we have signed our names, in presence of two witnesses, this 31st day of August, 1900.

ALBERIC FRANC.
FRANCISQUE VOLAND.

Witnesses:
THOS. N. BROWNE,
MARM VACHON.